Figure 1:
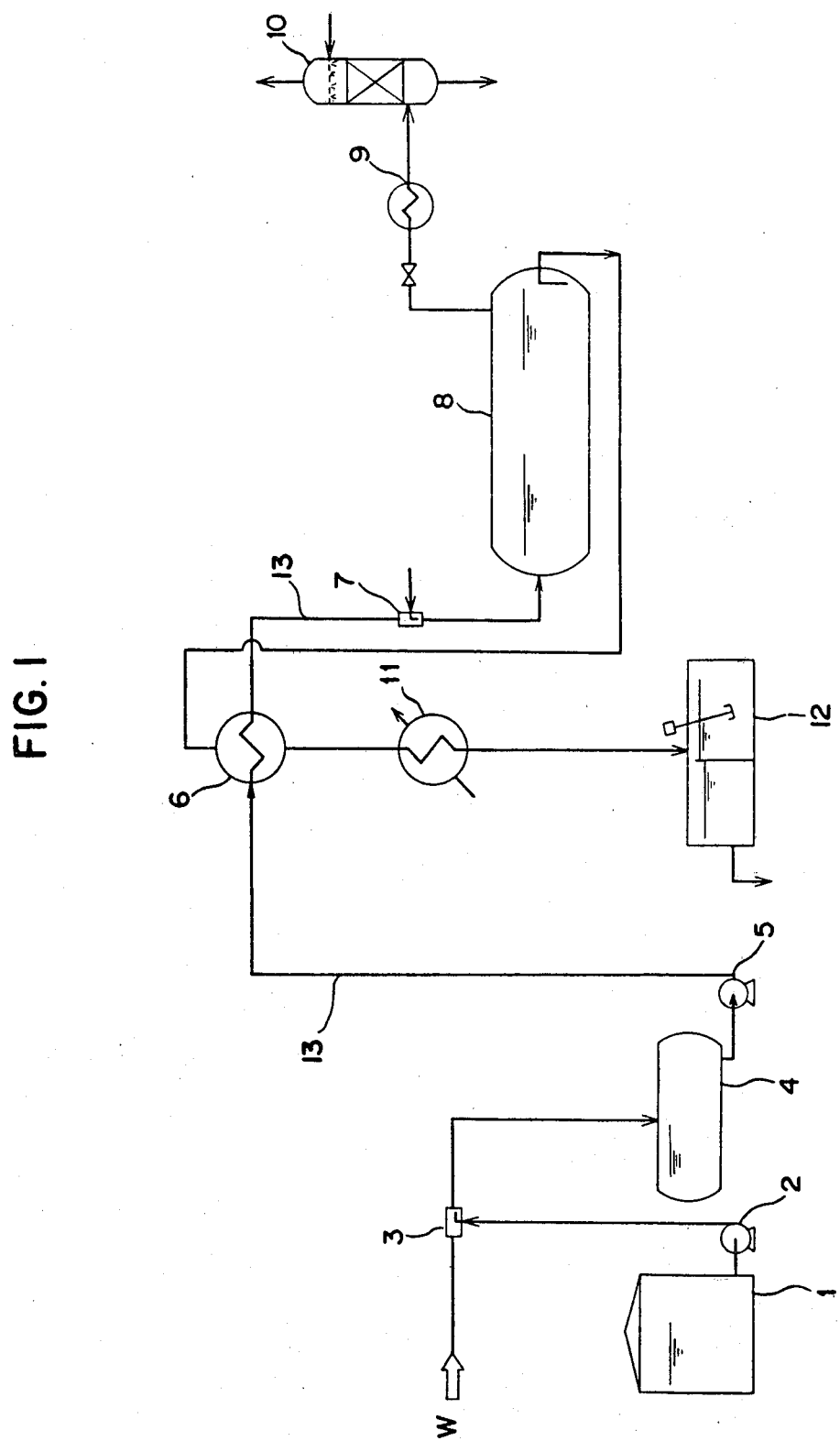

United States Patent [19]

Okugawa

[11] 4,402,837
[45] Sep. 6, 1983

[54] PROCESS FOR TREATMENT OF A LIQUID CONTAINING A NICKEL CYANIDE COMPOUND

[75] Inventor: Michihide Okugawa, Amagasaki, Japan

[73] Assignee: Dainichi-Nippon Cables, Ltd., Hyogo, Japan

[21] Appl. No.: 266,010

[22] Filed: May 21, 1981

[30] Foreign Application Priority Data

May 22, 1980 [JP] Japan ............................... 55-68672

[51] Int. Cl.³ .............................................. C02F 1/58
[52] U.S. Cl. ................................... 210/758; 210/766; 210/904
[58] Field of Search ............... 210/737, 750, 758, 766, 210/904, 761

[56] References Cited

U.S. PATENT DOCUMENTS

| | | | |
|---|---|---|---|
| 2,459,464 | 1/1949 | Smith | 210/758 X |
| 3,394,080 | 7/1968 | Hoffman et al. | 210/904 X |
| 3,464,917 | 9/1969 | Porteous | 210/600 X |
| 3,617,567 | 11/1971 | Mathre | 210/737 X |
| 3,945,919 | 3/1976 | Schindewolf | 210/750 |
| 4,042,502 | 8/1977 | Schmidt et al. | 210/766 X |

Primary Examiner—Thomas G. Wyse
Attorney, Agent, or Firm—Birch, Stewart, Kolasch & Birch

[57] ABSTRACT

A process for continuous treatment of a liquid containing a nickel cyanide compound which comprises (1) continuously supplying the said liquid containing a water-soluble metal hydroxide in a content of not less than 0.5 mol per mol of the nickel cyanide compound to a continuous reactor through a supply pipe, steam being introduced into the supply pipe so as to heat the said liquid to a temperature of 175° to 200° C., (2) passing the said liquid through the reactor while maintaining the said liquid at the said temperature and (3) discharging from the reactor the liquid having a CN content lower than that of the liquid prior to the supply to the reactor.

7 Claims, 1 Drawing Figure

PROCESS FOR TREATMENT OF A LIQUID CONTAINING A NICKEL CYANIDE COMPOUND

The present invention relates to a process for the treatment of a liquid containing a nickel cyanide compound, and an apparatus to be used therein. More particularly, it relates to a continuous process for efficient treatment of a large amount of a liquid containing a nickel cyanide compound to reduce significantly the CN content in the liquid, and an apparatus to be used therein.

In recent years, environmental pollution has become a serious social problem, and the tolerance limits of polluting components discharged in industrial waste waters have become more severe. In case of waste liquids containing a cyanide, the regulations concerning tolerance limits have been extended from the harmful free CN content to the CN content comprising less harmful cyanide compounds.

For treatment of a liquid containing a nickel cyanide compound, there have been proposed a process wherein the liquid is treated at a high temperature above 150° C. [Japanese Patent Publication (examined) No. 45679/1977] and a process wherein the liquid is treated at such high temperature in the presence of an alkali [PPM, No. 8, pages 58-67 (1977)]. However, these processes are directed to batchwise treatment and not suitable for treating a large amount of an industrial waste liquid requiring a reactor of great capacity. Further, Japanese Patent Publication (examined) No. 45679/1977 discloses the method of heating an industrial waste liquid to a high temperature by direct injection of steam into the liquid in a reactor or by heating the reactor from its outside. However, these heating methods can hardly heat a waste liquid in a reactor of great capacity uniformly to a desired high temperature. Since heating is insufficient at some localized parts, sufficient decomposition of the nickel cyanide compound does not take place at those localized parts. Thus, it is hardly possible to reduce the CN content of the liquid to a low degree, e.g. 1 ppm, after such treatment. Besides, there are usually present many concaves of different sizes on the inner wall of a reactor, and the waste liquid in such concaves is hardly heated and, without receiving sufficient heat treatment, is discharged from the reactor. This prevent proper reduction or lowering of the CN content.

A main object of the present invention is to provide a continuous process for efficient treatment of a large amount of a liquid containing a nickel cyanide compound to obtain a liquid wherein the CN content is significantly lowered, particularly below about 1 ppm.

The said object of this invention can be attained by (1) continuously supplying a liquid containing a nickel cyanide compound and a water-soluble metal hydroxide in an amount of not less than 0.5 mol per mol of the nickel cyanide compound to a continuous reactor through a supply pipe, steam being introduced into the supply pipe so as to heat the said liquid to a temperature of 175° to 200° C., (2) passing the said liquid through the reactor while maintaining the said liquid at the said temperature and (3) discharging from the reactor the liquid having a CN content lower than that of the liquid prior to the supply to the reactor.

The liquid to be treated in the process of this invention is a liquid containing a nickel cyanide compound. As the nickel cyanide compounds, there are for example compounds having a group of the formula: $Ni(CN)_4$, such as $K_2[Ni(CN)_4]$, $Na_2[Ni(CN)_4]$, $(NH_4)_2[Ni(CN)_4]$, $Ca[Ni(CN)_4]$, $Ba[Ni(CN)_4]$, $Sr[Ni(CN)_4]$, $Zn[Ni(CN)_4]$, $Pb_2(OH)_2[Ni(CN)_4]$ and $Pb_3(OH)_4[Ni(CN)_4]$, and their hydrates. Hardly water-soluble or insoluble compounds such as NiCN and $Ni(CN)_2$, and their hydrates, are also for example as the nickel cyanide compounds. Further examples are other organic and inorganic nickel cyanide compounds. The CN content in the liquid to be treated may be usually from 10 ppm to 1,000 ppm, although liquid having a higher or lower CN content can be also treated.

The liquid to be treated is required to include a water-soluble metal hydroxide in a content of not less than 0.5 mol, preferably not less than 2 mol, per mol of the nickel cyanide compound therein on its heat treatment. Due to this requirement, the liquid to be treated may be first adjusted so as to include a water-soluble metal hydroxide. The adjustment may be effected by incorporating any water-soluble metal hydroxide in a solid form or, preferably, in a solution form into the liquid to be treated so as to make a desired content as stated above. Examples of the water-soluble metal hydroxide are alkali metal hydroxides (e.g. LiOH, KOH, NaOH), alkaline earth metal hydroxides (e.g. $Ba(OH)_2$, $Ca(OH)_2$, $Sr(OH)_2$), etc. Among them, KOH and NaOH are particularly preferred.

When the liquid to be treated is an industrial waste water, it may sometimes already contain a considerable amount of a water-soluble metal hydroxide. Even in such case, the above adjustment is necessary if the water-soluble metal hydroxide content is lower than the said lower limit. If the water-soluble metal hydroxide content is confirmed to be more than the said lower limit, such liquid may be subjected to heat treatment as it is.

In the process of this invention, the liquid to be treated is subjected to heat treatment under such a condition that the liquid heated. For this necessity, the incorporation of the water-soluble metal hydroxide into the liquid to be treated should be effected before the supply of the liquid to be treated into the reactor, not after such supply. In the case where the liquid to be treated is preheated prior to the heat treatment as hereinafter stated, the supply is favorably effected prior to the pre-heating of the liquid to be treated at the supply pipe.

Industrial waste liquids to be treated often momentarily vary in amount and composition. Therefore, it is preferred to send such a liquid to be treated to a receiving tank, such as a buffer tank or a storage tank, and then send the liquid into the reactor at a constant rate. When the liquid is neutral or acidic, poisonous HCN gas may be produced from the nickel cyanide compound in the liquid at the receiving tank. In order to prevent such production of HCN gas, the liquid is required to be made alkaline. Due to this reason, the incorporation of the water-soluble metal hydroxide into the liquid to be treated may be effected in the receiving tank or prior to sending to the receiving tank.

The heat treatment of the liquid is carried out at a temperature of 175° to 200° C., preferably at 180° to 190° C. When the temperature is lower than 175° C., the decomposition rate becomes small so that a reactor of great capacity is required for continuous treatment of a large amount of the liquid. When the temperature is higher than 200° C., the decomposition of the nickel cyanide compound proceeds rapidly so that a great volume of ammonia is instantaneously produced resulting in an abrupt elevation of the pressure in the reactor, which forces a safety valve to open so as to stop the heat treatment of this invention.

In addition to the adoption of the said temperature range, it is necessary for attaining the reduction of the CN content to such a low level as 1 ppm or less to effect the heating uniformly so as to avoid the occurrence of any localized part where the temperature is not within the desired temperature range. For achievement of the uniform heating, the liquid to be treated is heated to a desired temperature in the supply pipe for transporting the same to the reactor.

Heating of the liquid to be treated at room temperature to a desired temperature solely by introducing steam into the supply pipe requires a great amount of steam and makes the heating portion much larger. In order to avoid these disadvantages, it is recommended to pre-heat the liquid to a high temperature, for instance, such a temperature as 20° C. lower than the temperature for heat treatment. A variety of pre-heating methods may be adopted. Most preferred is, however, that the liquid is subjected to heat exchange with the liquid after treatment, which is at a high temperature, so that the liquid to be treated is pre-heated, while the liquid after treatment is cooled. As the heat exchanger, there may be used any conventional one, but preferred is a spiral type heat exchanger making it possible to continuously treat a large amount of the liquid.

The retention time of the liquid to be treated in the reactor may be appropriately decided to obtain a CN content of 1 ppm or less in the treated liquid taking into consideration the CN content in the liquid to be treated, the water-soluble metal hydroxide concentration in the liquid to be treated, the heat treatment temperature, etc. In general, it may be not less than 10 minutes, preferably from 20 to 60 minutes, although the retention time of not more than several minutes is usually sufficient for the liquid having a low CN content of 100 ppm or less.

Over the said retention time, the liquid to be treated is required to be retained within the said temperature range for heat treatment. Usually, the depression in temperature is not remarkable, and any special equipment for maintenance of the temperature is not necessarily needed. In a cold time or at a cold place, however, the depression is sometimes notable, and the maintenance of the said temperature range by the use of lagging materials is needed.

In the reactor, the nickel cyanide compound may be decomposed to produce ammonia. Because of this reason, it is not favorable to fill up the reactor with the liquid to be treated. In other words, a gas phase portion of about 20 to 50% by volume may be left for the purpose of safety control of the pressure in the reactor. The produced ammonia is discharged together with steam from a discharge nozzle set at the upper part of the reactor and, after cooling, introduced into a washing tower so as to be caught with water or a mineral acid solution, e.g. dilute sulfuric acid.

Thus, treated liquid wherein the CN content is reduced to 1 ppm or less is preferably sent to the heat exchanger and cooled with the liquid to be treated. Alternatively, the treated liquid may be cooled with cooling water. When the treated liquid indicates a high pH value due to the remaining metal hydroxide, it may be neutralized with a mineral acid solution, e.g. dilute sulfuric acid.

In carrying out the process as explained above, there may be used any apparatus which comprises a continuous reactor provided with an inlet for introducing therein the liquid to be treated and an outlet for discharging therefrom the treated liquid, a supply pipe through which the liquid to be treated is sent to the reactor and a steam introducing means provided at the supply pipe.

The apparatus may further comprise a quantitative determination means, i.e. a means for quantitative determination of the nickel cyanide compound and the water-soluble metal hydroxide in the liquid to be treated, and/or a supply means, i.e. means for supplying the water-soluble metal hydroxide into the liquid to be treated. As the quantitative determination means, there may be used any conventional quantitative analyzer such as a pH meter, an atomic absorption analyzer or an automatic continuous CN analyzer. When the liquid to be treated already contains the necessary amount of the water-soluble metal hydroxide, a supply means for introducing such a metal hydroxide is not necessary. The quantitative determination means may be provided on any appropriate place such as a transportation pipe for sending the liquid to be treated to a receiving tank, or may be provided within a plant where the liquid to be treated is produced.

On the other hand, when the quantitative relationship between the nickel cyanide compound and the water-soluble metal hydroxide is already known or determinative by any other appropriate procedure, the supply means alone may be provided without any quantitative determination means. The supply means may comprise a mixing means for mixing the water-soluble metal hydroxide with the liquid. As the mixing means, there may be used any conventional mixing equipment such as an impeller agitator, a liquid circulation agitator or an air injection agitator. For efficient mixing, the use of a line mixer as the mixing means is favorable. Particularly when a receiving tank for the liquid to be treated is adapted, a line mixer may be provided at a pipe for transportation of the liquid to be treated to the receiving tank.

When desired, a pre-heating means may be provided for pre-heating the liquid to be treated between the supply means and the steam introducing means. At an upper stream of the pre-heating means, a receiving tank for the liquid to be treated, if necessary, is provided. Further, the treating means for ammonia as the decomposition product, the neutralization means for the treated liquid, etc. may also be provided.

The pre-heating means may be a heat exchanger and is particularly preferred to be a spiral type heat exchanger.

The continuous reactor is required to be made of a material which is not only resistant to heat and pressure but also resistant to alkali. Examples of such material are steel, stainless steel, titanium, etc. The reactor may also be constructed with a clad material consisting of the said metal.

With reference to the accompanying drawing, the present invention will be illustrated more in detail.

In FIG. 1, the liquid to be treated (W) is, if necessary, admixed with a water-soluble metal hydroxide solution sent from a tank 1 by the aid of a pump 2 at a line mixer 3. The resultant mixture is sent to and stored in a buffer tank 4. The buffer tank 4 is not necessarily required but is practically useful.

The liquid to be treated is sent through a supply pipe 13 to a heat exchanger 6 by the aid of a pump 5 with a constant flow rate and pre-heated by the treated liquid flowing through the heat exchanger 6. Then, the pre-heated liquid is heated to a temperature for heat treatment (i.e. from 175° to 200° C.) by steam of high temperature and high pressure injected from a steam ejector 7 provided at the supply pipe 13. The heated liquid is sent to a continuous reactor 8 and passes through the same with a certain retention time, during which the nickel cyanide compound is decomposed.

Ammonia as the decomposition product of the nickel cyanide compound occupies together with steam at the gas phase portion in the reactor. When desired, it is discharged from the upper part of the reactor, cooled with a cooler 9 below 80° C. and introduced into a washing tower 10. While condensable and absorptive gas components such as ammonia and steam are caught, non-condensable and non-absorptive gas components are exhausted from the top of the tower into the atmosphere.

The treated liquid from the reactor 8 is sent to the heat exchanger 6 for utilizing it as a heating medium, and cooled. The cooled liquid is sent through another heat exchanger 11 to a neutralization tank 12, neutralized with dilute sulfuric acid solution, and exhausted.

The CN content in the thus treated liquid is below 1 ppm. In addition, the alkali is neutralized. Therefore, the discharge of the treated liquid does not cause any pollution problem. Still, the nickel component in the nickel cyanide compound is converted into harmless hydroxide or, sometimes, oxide.

Practical and presently preferred embodiments of the invention are illustratively shown in the following examples wherein the total cyanide content is determined by the method as described in JIS (Japanese Industrial Standard) K 0102 (1978) 29.1.2. In the case where a liquid to be determined contains insoluble materials, sampling from the liquid is carried out after sufficient agitation to uniformly disperse the insoluble materials.

EXAMPLE 1

An industrial waste water containing 0.4 g of $K_2[Ni(CN)_4] \cdot H_2O$ per liter (CN content, 160 ppm) was subjected to continuous treatment at a rate of 12 m³/hour by the use of an apparatus as shown in FIG. 1 of the accompanying drawing under the following conditions:

Temperature of the waste water: 80° C.;
Temperature of the waste water after pre-heating: 170° C.;
Temperature of steam for heating: 185° C.;
Temperature of the waste water supplied to the continuous reactor: 180° C.;
Capacity of the reactor: 20 m³.

Prior to the treatment, sodium hydroxide was admixed to the waste water in a concentration as shown in Table 1 wherein the pH is also shown.

The CN content in the waste water after treatment is shown in Table 1.

TABLE 1

| NaOH (g/liter) | 0.5 | 1.0 | 2.0 |
|---|---|---|---|
| pH | 12.2 | 12.5 | 12.7 |
| CN content in the waste water after treatment (ppm) | 0.42 | 0.03 | 0.04 |

The retention time of the waste water in the reactor was 60 minutes, and the temperature of the waste water after the treatment was 179° C.

EXAMPLE 2

An industrial waste water containing 0.03 g of $Ni(CN)_2$, 0.03 g of NaCN and 0.02 g of NaOH per liter (CN concent, 30 ppm) was subjected to continuous treatment as in Example 1 but using a reactor having a capacity of 5 m³.

When the treatment was effected with a rate of 9 m³/hour (retention time, 20 minutes) or with a rate of 6 m³/hour (retention time, 30 minutes), the CN content of the waste water after each treatment was 0.1 or 0.05 ppm.

EXAMPLE 3

An industrial waste water containing 0.06 g of $Ni(CN)_2$, 0.08 g of NaCN and 4 g of NaOH per liter (CN content, 66 ppm) was subjected to continuous treatment as in Example 1 but using a reactor having a capacity of 5 m³.

When the treatment was effected with a rate of 9 m³/hour (retention time, 20 minutes) or with a rate of 6 m³/hour (retention time, 30 minutes), the CN content of the waste water after each treatment was 0.07 or 0.00 (not detectable ) ppm.

EXAMPLE 4

An industrial waste water containing 0.1 g of $Ni(CN)_2 \cdot 3H_2O$ and 0.1 g of NaOH per liter (CN content, 31 ppm) was subjected to continuous treatment as in Example 1 but using a reactor having a capacity of 5 m³.

When the treatment was effected with a rate of 9 m³/hour (retention time, 20 minutes) or with a rate of 6 m³/hour (retention time, 30 minutes), the CN content of the waste water after each treatment was 0.18 or 0.12 ppm.

COMPARATIVE EXAMPLE 1

In the same manner as in Example 1, the waste water was treated by effecting the introduction of steam for heating not from the ejector 7 but directly to the waste water in the reactor. During the operation, the thermometer provided at the position about 20 cm apart from the opening of a steam injector pipe indicated a constant temperature of 180° C. The CN content of the waste water after the treatment was 3.5 ppm in case of the added amount of NaOH being 0.5 g per liter.

What is claimed is:

1. A process for continuous treatment of a liquid containing a nickel cyanide compound which comprises (1) incorporating the liquid with a water-soluble metal hydroxide so as to adjust the amount of the water-soluble metal hydroxide to be not less than 0.5 mol per mol of the nickel cyanide compound, (2) continuously supplying the liquid to a continuous reactor through a supply pipe, the liquid being heated to a temperature of 175° to 200° C. prior to the supply to the reactor by introducing steam into the supply pipe, (3) passing the liquid through the reactor with a retention time of not less than 10 minutes while maintaining the liquid within the said temperature range, and (4) discharging from the reactor the liquid having a CN content of not more than 1 ppm.

2. The process according to claim 1, wherein the initial liquid prior to the supply to the reactor is incorporated with a water-soluble metal hydroxide so as to adjust the content of the water-soluble metal hydroxide to be not less than 0.5 mol per mol of the nickel cyanide compound.

3. The process according to claim 1, wherein the liquid incorporated with the water-soluble metal hydroxide is pre-heated to a temperature lower than the temperature to be maintained in the reactor.

4. The process according to claim 1, wherein the pre-heating is effected by heat exchange with the liquid discharged from the reactor.

5. The process according to claim 1, wherein the nickel cyanide compound is a compound having a group of the formula: [Ni(CN)$_4$].

6. The process according to claim 5, wherein the nickel cyanide compound is K$_2$[Ni(CN)$_4$] or Na$_2$[Ni(CN)$_4$], or its hydrate.

7. The process according to claim 1, wherein the nickel cyanide compound is NiCN or Ni(CN)$_2$, or its hydrate.

* * * * *